US009829073B2

(12) United States Patent
Teillet

(10) Patent No.: US 9,829,073 B2
(45) Date of Patent: Nov. 28, 2017

(54) GEARBOX FOR A SELF-PROPELLED DEVICE SUCH AS A LAWNMOWER

(71) Applicant: FRANCE REDUCTEURS, Les Herbiers (FR)

(72) Inventor: Emmanuel Teillet, Les Chatelliers Chateaumur (FR)

(73) Assignee: FRANCE REDUCTEURS, Les Herbiers (FR)

( * ) Notice: Subject to any disclaimer, the term of this patent is extended or adjusted under 35 U.S.C. 154(b) by 170 days.

(21) Appl. No.: 14/758,834

(22) PCT Filed: Dec. 26, 2013

(86) PCT No.: PCT/FR2013/053267
§ 371 (c)(1),
(2) Date: Jul. 1, 2015

(87) PCT Pub. No.: WO2014/106714
PCT Pub. Date: Jul. 10, 2014

(65) Prior Publication Data
US 2015/0337924 A1 Nov. 26, 2015

(30) Foreign Application Priority Data

Jan. 7, 2013 (FR) ...................................... 13 50101

(51) Int. Cl.
*F16H 37/06* (2006.01)
*F16H 3/10* (2006.01)
(Continued)

(52) U.S. Cl.
CPC ........... *F16H 3/10* (2013.01); *A01D 34/6806* (2013.01); *F16H 3/083* (2013.01); *F16H 3/085* (2013.01);
(Continued)

(58) Field of Classification Search
CPC ...... F16H 48/08; F16H 2048/085; F16H 1/14; F16H 1/222
(Continued)

(56) References Cited

U.S. PATENT DOCUMENTS 2,937,539 A * 5/1960 Mueller ................. B23Q 5/142
192/71
4,662,241 A * 5/1987 Edwards ................ B60K 17/08
475/206
(Continued)

FOREIGN PATENT DOCUMENTS

EP 1 707 837 A1 10/2006
FR 2 709 798 A1 3/1995
FR 2 885 656 A1 11/2006

OTHER PUBLICATIONS

International Search Report, dated Mar. 28, 2014, from corresponding PCT application.

*Primary Examiner* — Ha D Ho
(74) *Attorney, Agent, or Firm* — Ipsilon USA, LLP

(57) ABSTRACT

A gearbox for a self-propelled machine includes primary and secondary shafts, each having a respective gear train aligned with one another around the shaft. Each gear of the gear train of the primary shaft permanently meshes with a respective gear of the secondary shaft. A gearing mechanism includes a driving member meshing with a driven member for being coupled to/decoupled from the primary shaft by a clutch mechanism. At least one key is engaged selectively with a gear carried by the secondary shaft. The secondary shaft includes two half-shafts mounted freely rotatable relative to each other and aligned by a sleeve inside which one end of each half-shaft is received. The sleeve has at least one longitudinal guide path along which the key, constrained to rotate with the sleeve, is mounted to move axially, this (Continued)

key-holder sleeve being coupled to each of the half-shafts via a respective declutchable coupling.

20 Claims, 6 Drawing Sheets

(51) Int. Cl.
*F16H 3/085* (2006.01)
*F16H 57/04* (2010.01)
*F16H 3/083* (2006.01)
*A01D 34/68* (2006.01)

(52) U.S. Cl.
CPC . *F16H 57/0441* (2013.01); *F16H 2200/0039* (2013.01); *Y10T 74/19005* (2015.01)

(58) Field of Classification Search
USPC .................................................. 74/650, 665 F
See application file for complete search history.

(56) References Cited

U.S. PATENT DOCUMENTS

| | | | | |
|---|---|---|---|---|
| 4,779,475 | A | * | 10/1988 | Irikura .................... F16H 3/083 192/48.91 |
| 4,841,794 | A | | 6/1989 | Hikishima |
| 5,287,769 | A | * | 2/1994 | von Kaler .............. B60K 17/08 74/371 |
| 5,601,000 | A | | 2/1997 | Blanchard |
| 5,850,758 | A | | 12/1998 | McCloud et al. |
| 2007/0000348 | A1 | | 1/2007 | Blanchard |

* cited by examiner

GEARBOX FOR A SELF-PROPELLED DEVICE SUCH AS A LAWNMOWER

The present invention relates to a gearbox for a self-propelled machine, such as a lawn mower.

It relates more particularly to a gearbox of the type comprising a casing inside which the following are housed, at least in part: a primary shaft equipped with a train of gears that are mounted to be constrained to rotate with said primary shaft; a secondary shaft equipped with a train of gears disposed in alignment with one another and mounted to be free to rotate about said secondary shaft; each gear of the gear train of the primary shaft being held permanently meshing with a respective gear of the secondary shaft; the primary shaft being driven in rotation by means of a gearing mechanism comprising a driving member meshing with a driven member suitable for being coupled to/decoupled from said primary shaft by means of a clutch mechanism, the rotary movement of the primary shaft being transmitted to the secondary shaft by means of a key that is mounted to move axially along the secondary shaft and that is suitable, during its axial movement, for coming into selective contact with the inner peripheral edge of a gear carried by the secondary shaft in such a manner as to engage said gear selectively.

Such gearboxes are known as illustrated, in particular, by Patent Document FR 2 709 798. In such gearboxes, the secondary shaft is made in one piece, so that such a gearbox does not enable the wheels of the machine to rotate at different speeds, in particular when going round a bend.

In other words, the design of the gearbox does not incorporate any differential function other than including a ratchet system at its wheels, which is not satisfactory in terms of mechanical strength, such ratchet systems being subjected to grass cuttings and to other dirt.

An object of the present invention is thus to propose a gearbox of design making it possible to incorporate a differential function without adversely affecting the overall mechanical strength of the assembly.

Another object of the present invention is to propose a gearbox of design making it possible to obtain a compact overall assembly.

To this end, the invention provides a gearbox for a self-propelled machine, such as a lawn mower, the gearbox being of the type comprising:

- a casing inside which the following are housed, at least in part: a primary shaft equipped with a train of gears that are mounted to be constrained to rotate with said primary shaft; a secondary shaft equipped with a train of gears disposed in alignment with one another and mounted to be free to rotate about said secondary shaft; each gear of the gear train of the primary shaft being held permanently meshing with a respective gear of the secondary shaft;
- rotary drive means for driving the primary shaft in rotation; and
- at least one key via which the rotary movement of the primary shaft is suitable for being transmitted to the secondary shaft, said at least one key being mounted to move axially along the secondary shaft and being suitable, during its axial movement, for coming into selective contact with the inner peripheral edge of a gear carried by the secondary shaft in such a manner as to engage said gear selectively;

said gearbox being characterized in that the secondary shaft is made up of two half-shafts that are mounted to be free to move in rotation relative to each other, and in that the gearbox further comprises a sleeve threaded over the two half-shafts, said sleeve being provided with at least one longitudinal guide path, such as a groove, along which the key, which is constrained to rotate with the sleeve, is mounted to move axially, this key-holder sleeve being coupled to each of the half-shafts via a respective declutchable coupling suitable for being declutched when the corresponding half-shaft is driven in rotation in a predetermined direction at a speed of rotation greater than the speed of rotation of the sleeve.

By means of the chosen design, the sleeve is a multi-purpose sleeve that acts as a key-holder part and as a gear-carrier part, as a differential in co-operation with the two half-shafts by means of the fact that the sleeve is mounted to be constrained to rotate with each of the two half-shafts via a respective declutchable coupling, and optionally as means for aligning the two half-shafts and for holding them in the aligned position.

Preferably, the two half-shafts are held in alignment by means of said sleeve, inside which one end of each half-shaft is received.

The declutchable coupling between sleeve and half-shaft makes it possible, when the coupling is in the clutched state, to drive the half-shaft in rotation at a speed of rotation identical to the speed of rotation of the sleeve and, when the coupling is in the declutched state, to drive the half-shaft in rotation at a speed greater than the speed of rotation of the sleeve. This declutching takes place automatically when the half-shaft is driven at a speed of rotation greater than the speed of rotation of the sleeve, e.g. when the machine is at a standstill, while the machine is being pushed manually, or while it is going round bends.

Since each half-shaft is coupled to the sleeve by its own declutchable coupling, each half-shaft can be driven at a speed of rotation different from the speed of rotation of the other half-shaft.

It should be noted that, above and below, whenever it is indicated that the secondary shaft is made up of two half-shafts, it should be understood that the secondary shaft is made up of two shaft segments or sections. It is unimportant whether or not the two segments are of identical length or of different lengths.

Preferably, at least one of, and preferably each of the declutchable couplings between half-shaft and sleeve is a dog clutch having a ratchet function.

Declutching the coupling can thus be achieved only in one direction of rotation of the half-shaft, generally corresponding to the machine being driven forwards.

Preferably, at least one of the declutchable couplings between half-shaft and sleeve comprises a dog clutch mounted to be constrained to rotate with and to move axially on the half-shaft, this dog clutch being equipped with return means for urging it to return to a position close to one end of the sleeve, said dog clutch and the end of the sleeve being equipped with teeth that interpenetrate with one another in the position in which the dog clutch is closer to the end of the sleeve, said teeth being of ramp-shaped profile configured to make it possible, during the clutching stage, for the end of the sleeve and the dog clutch to be constrained to rotate with each other, and therefore for the rotary movement of the sleeve to be transmitted to the half-shaft and, during the declutching stage, by the dog clutch moving axially in opposition to the return means, for the end of the sleeve and the dog clutch to be released so that they are no longer constrained to rotate with each other.

During the declutching stage, the half-shaft and the associated dog clutch tend to rotate faster than the sleeve, so that the dog clutch "jumps" from tooth to tooth at the sleeve. Under the effect of the speed differential between sleeve and half-shaft, the facing ramps of the teeth of the sleeve and of the dog clutch tend to generate axial movement of the dog clutch in the direction in which the dog clutch moves away from the sleeve until the teeth of the dog clutch escape from the gaps between the teeth of the sleeve and come, under the effect of the return means, to re-engage in the respective following gaps between the teeth. The succession of these back-and-forth movements of the dog clutch relative to the sleeve gives the impression of a dog clutch that "jumps" from tooth to tooth.

Preferably, the key, or at least one of the keys, is in the form of a ratchet tooth that is mounted to move axially along the longitudinal guide path of the sleeve via a ring that is mounted to slide on said sleeve and that is mounted to be constrained to move with the key.

Preferably, the sleeve is a sleeve provided with a shoulder and around which the gears carried by the secondary shaft are arranged. This configuration makes it possible to obtain an overall assembly that is compact and strong.

Preferably, the key, which constitutes a selection and control member for selecting and controlling engagement of the gear ratios, and which is suitable for coming into engagement with a notch provided in the inner peripheral edge of a gear carried by the secondary shaft, is held inside said notch by means of a return member.

Preferably, a washer is interposed between the gears of the gear train of the secondary shaft, in order to avoid two gears being engaged simultaneously with the secondary shaft.

Preferably, the means for driving the primary shaft in rotation include a gearing mechanism having at least one driving member meshing with a driven member that is suitable for being coupled to/decoupled from said primary shaft by means of a clutch mechanism, said clutch mechanism preferably being a cone clutch mechanism comprising at least one female cone and two male cones, the female cone being in the form of a wheel having an axial bore that has conical bearing surfaces, said wheel receiving the male cones that are disposed in alignment with the axial bore of the wheel, and that are suitable, under the action of a control device, for coming into bearing contact with a conical bearing surface of the wheel.

Such a clutch mechanism makes it possible to obtain clutching that is gradual and an assembly that is compact, it being possible for the clutch to be housed inside the casing.

Preferably, the female cone is provided internally with a set of teeth that is offset axially from the conical bearing surfaces relative to the axis of rotation of the component wheel of the cone, so that the conical bearing surfaces are disposed on the same side of the set of teeth, said female cone being mounted, via the set of teeth, to mesh permanently with the driven member of the gearing mechanism.

Preferably, the driven member of the gearing mechanism is in the form of a tubular body threaded over the primary shaft and mounted to be free to rotate on said shaft, said tubular body being provided at one end with an outer peripheral shoulder carrying, around its periphery, a first set of teeth suitable for coming to mesh with the female cone of the clutch mechanism and, on its face facing said body, a second set of teeth suitable for coming to mesh with the driving member of the gearing mechanism, said tubular body carrying a bladed wheel mounted to be constrained to rotate with said body, the blades of the wheel being oriented in such a manner as to generate a flow towards the peripheral shoulder provided with through orifices.

The invention also provides a self-propelled machine of the type including at least one gearbox, said self-propelled machine being characterized in that the gearbox is of the above-mentioned type.

The invention can be well understood on reading the following description of embodiments given with reference to the accompanying drawings, in which.

Figure 1:
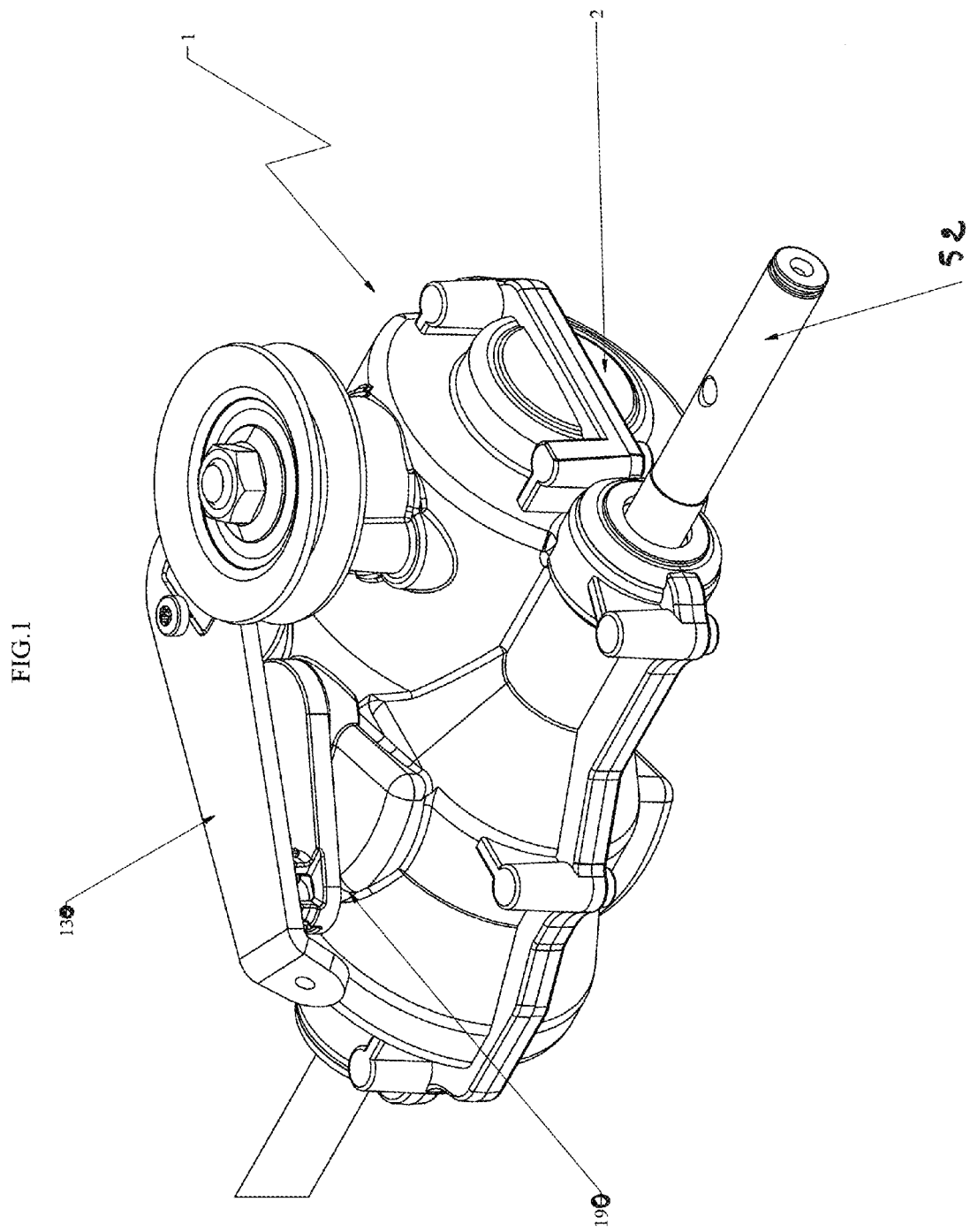
FIG. 1 is an overall view of a gearbox of the invention.

As indicated above, the gearbox 1 of the invention is more particularly designed to be installed in machines mounted to run on wheels, rollers or the like and in particular such machines that are self-propelled, such as lawn mowers.

The gearbox 1 includes a casing 2, which, in this example, is made up of two half-shells assembled together via a join plane. The housing 2 at least partially houses a primary shaft 3 and a secondary shaft 51, 52.

These shafts are generally parallel for reasons of simplicity of construction and of operation. The secondary shaft constitutes the drive shaft for driving the wheels of the self-propelled machine. The primary shaft is connected to the engine via a gearing mechanism 7 comprising a driving member 8 meshing with a driven member 9 that is suitable for being coupled to/decoupled from said primary shaft 3 by means of a clutch mechanism 10.

The primary and secondary shafts are equipped with respective gear trains. The primary shaft 3 has a train of gears 4 mounted to be constrained to rotate with said shaft, e.g. via fluting provided respectively in the gears 4 and on the primary shaft 3.

The secondary shaft 51, 52 has a train of gears 6 disposed in alignment and mounted to be free to rotate about said shaft.

In addition, each gear 4 of the gear train of the primary shaft 3 meshes permanently with a respective gear 6 of the secondary shaft.

At least one key 14 that is mounted to move axially along the secondary shaft and that is suitable, during its axial movement, for coming into selective contact with the inner peripheral edge of a gear 6 carried by the secondary shaft, makes it possible to transmit the rotary movement of the primary shaft 3 to the secondary shaft.

In a manner characteristic of the invention, said secondary shaft is made up of two half-shafts 51, 52 mounted to be free to rotate relative to each other, and, preferably held in alignment by means of a sleeve 15 inside which the end of each half-shaft is received. In a variant, a member, such as a pin, may be used to hold the two half-shafts in the aligned state.

The sleeve 15 is provided with at least one longitudinal guide path 16, which, in this example, is in the form of a longitudinal groove, along which the key 14, which is constrained to rotate with the sleeve 15, is mounted to move axially.

This key-holder sleeve 15 is coupled to each of the two half-shafts by a respective declutchable coupling 17. This coupling is suitable for being declutched when the corresponding half-shaft is driven in rotation in a predetermined direction at a speed of rotation greater than the speed of rotation of the sleeve 15.

In the examples shown, each declutchable coupling 17 between a half-shaft and the sleeve 15 is a dog-clutch coupling having a ratchet function. Each dog clutch 171 is in the form of an annular part threaded over a half-shaft and mounted to be constrained to rotate with the half-shaft via fluting that allows the dog clutch to move axially along the half-shaft but that constrain the dog clutch and the half-shaft to rotate with each other.

On its face facing the end of the sleeve, the dog clutch is provided with teeth 173 suitable for interpenetrating with teeth 174 provided at the end of the sleeve. This interpenetration makes it possible to couple together the sleeve and the half-shaft, and to transmit the rotary movement of the sleeve to the half-shaft.

In order to hold the teeth in interpenetration, a spring 172 urges the dog clutch back into the position in which it is close to the sleeve. In this example, said spring is a helical spring wound around the half-shaft. Due to the profile of the teeth, which are provided with ramps, the teeth of the dog clutch can slide from one tooth to another in the sleeve only when the half-shaft is driven in rotation by a ramp of the sleeve at a speed greater than the speed of rotation of the sleeve in a direction generally corresponding to the direction of forward movement of the machine.

Figure 5:
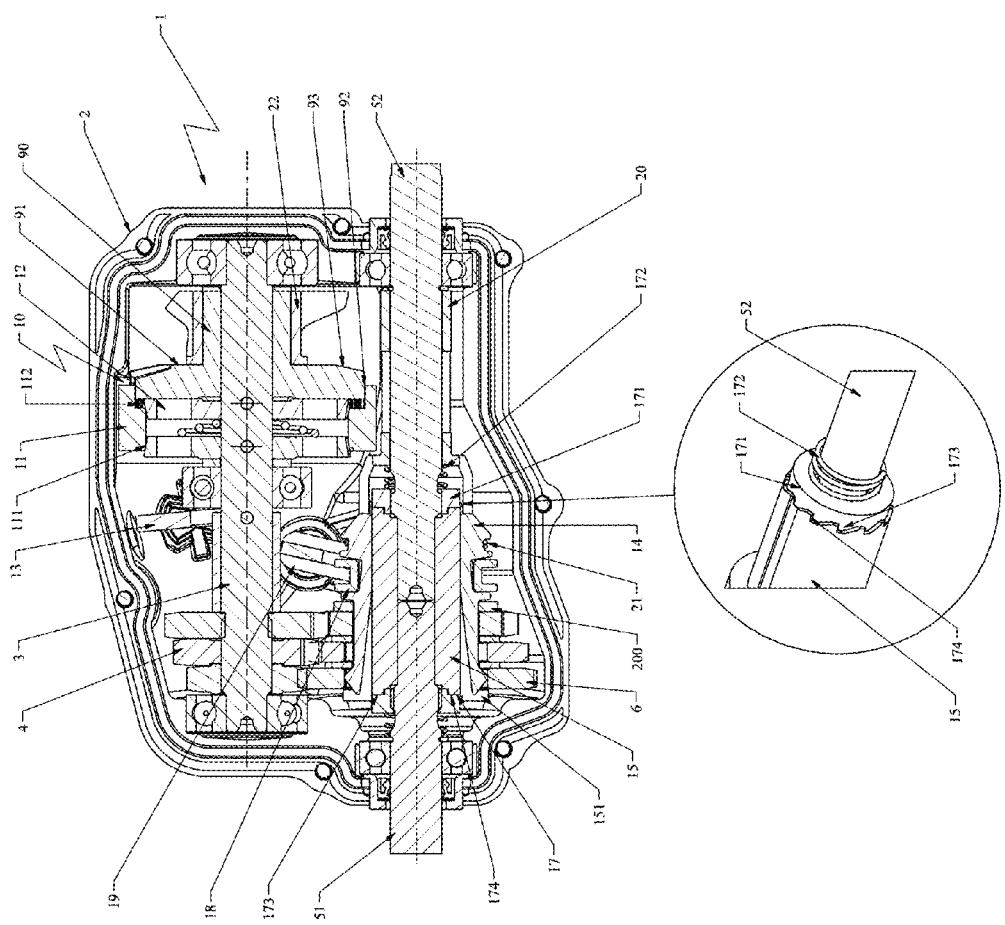
FIG. 5 is a section view of the gearbox with a detail view of the half-shaft/sleeve coupling in the clutched position.
Figure 6:
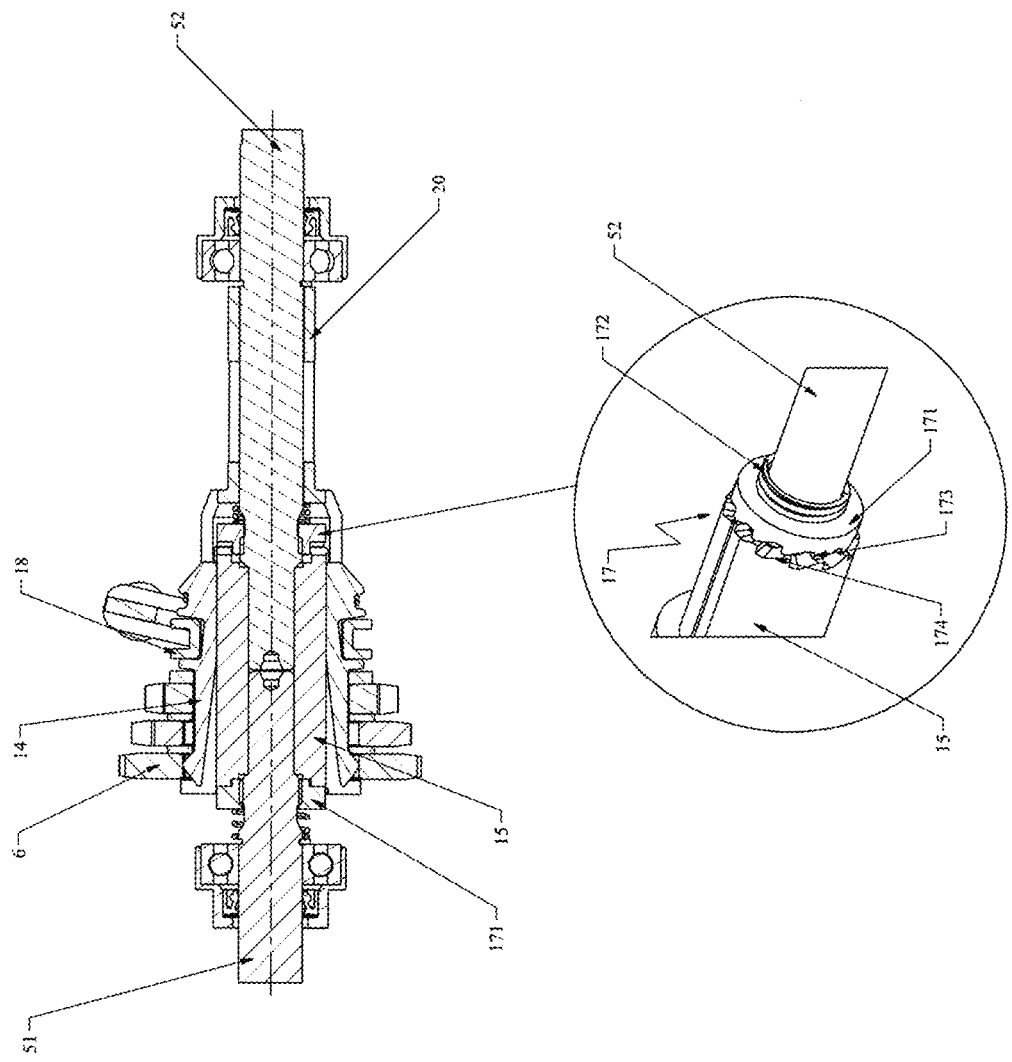
FIG. 6 is a fragmentary section view of the gearbox with a detail view of the half-shaft/sleeve coupling in the declutched position.

In this situation, the dog clutch tends to move axially along the associated half-shaft in the direction in which it moves away from the end of the sleeve, as shown in the detail view of FIG. 6 into a declutched position, and is returned into a position close to said sleeve by the spring 172 so as to come into a clutched position as shown in the detail of FIG. 5.

In order to enable the rotary movement of the sleeve to be transmitted to the half-shaft, it is necessary, in a first stage, to drive the primary shaft 3 in rotation. In this example, this driving in rotation takes place via a gearing mechanism 7 comprising a driving member 8 meshing with a driven member 9 that is suitable for being coupled to/decoupled from said primary shaft 3 by means of a clutch mechanism 10. The driven member may also come to mesh directly with the primary shaft.

In the example shown, the driving member 8 is a bevel gear that is carried by an inlet shaft in a manner such as to be constrained to rotate therewith, which inlet shaft projects partially from the casing. Said inlet shaft carries a pulley of a belt transmission that connects the engine of the machine to said inlet shaft. The inlet shaft is thus driven in rotation, with the bevel gear 8, by the engine of the machine.

The rotary movement of bevel gear 8 is transmitted to the driven member 9 that, in this example, is in the form of a tubular body 90 threaded over the primary shaft 3 and mounted to be free to rotate on said shaft 3. This tubular body 90 is provided at one end with an outer peripheral shoulder 91 carrying a "second" set of teeth 93 on its face facing towards said body.

Said second set of teeth 93 is suitable for coming to mesh with the driving member 8 of the gearing mechanism 7.

In the examples shown, the tubular body 90 also carries a bladed wheel 22 mounted to be constrained to rotate with said body. The blades of the wheel 22 are oriented in such a manner as to generate a flow towards the peripheral shoulder 91 provided with through orifices 94 for feeding fluid, such as a grease or a lubricant, to the clutch mechanism that is described below and that is disposed on the other side of the peripheral shoulder of the driven member.

In equivalent manner, said gearing mechanism 7 could be in the form of a worm screw forming the driving member meshing with a toothed wheel forming the driven member.

Around the periphery of its peripheral shoulder 91, the driven member has a "first" set of teeth 92 suitable for coming to mesh with the clutch mechanism 10 that, in the clutched position, enables the movement of the driven member 9 to be transmitted to the primary shaft 3.

This clutch mechanism 10 is a cone clutch carried by the primary shaft. Said clutch mechanism 10 includes a female cone 11 that is in the form of a wheel having an axial bore that has conical bearing surfaces 111.

The wheel making up the female cone 11 is threaded over the primary shaft 3 and is mounted to be free to rotate on said shaft. The two conical bearing surfaces 111 of the wheel have divergent surfaces that diverge from the centre of the bore towards the outside of the bore. The wheel is also provided internally with a circular set of teeth 112 that is offset axially from the conical bearing surfaces 111 relative to the axis of rotation of the component wheel of the cone, so that the conical bearing surfaces 111 are disposed on the same side of the set of teeth 112. Said female cone 11 is mounted via the set of teeth 112, to mesh permanently with the driven member 9 of the gearing mechanisms 7.

The clutch mechanism also includes two male cones 12 received in the axial bore in the component wheel of the female cone 11. Each male cone 12 is centrally hollow so that it can be threaded over the primary shaft 3. The central hollow portion of each made cone 12 is provided with fluting suitable for co-operating with fluting on the shaft that carries the cones in such a manner as to constrain the male cones and the primary shaft 3 to rotate together.

Each bearing surface 111 of the wheel co-operates by controlled bearing contact with a male cone 12. Bringing the male cones 12 closer, resulting in the clutch going into the clutched position, is caused by an appropriate actuator member 13, such as a clutch fork, caused to move by a pivotally mounted lever 130 disposed outside the casing, on the casing.

Said lever 130 is driven in rotation about an axis that is perpendicular to the primary shaft 3. While it is being moved angularly, the fork 13 exerts an axial compression force on the stack made up of male and female cones. More precisely, under the force of the fork 13, a first male cone is moved axially by the fork against a conical bearing surface of the female cone 11 that is, itself moved against the other male cone. The axial movement is stopped by the peripheral shoulder 91 of the driven member 9 that acts as an abutment. The outer surfaces of the male cones 12 co-operate by friction contact with the conical bearing surfaces of the female cone 11. Due to the friction forces, the primary shaft 3 is driven in rotation.

The gears 4 of the primary shaft 3 mesh with the gears 6 of the secondary shaft and drive them in rotation. The rotary movement of one of the gears is transmitted via at least one key 14 to the sleeve 15 that itself transmits the rotary movement to the half-shafts 51, 52.

In the example shown, it can be observed that each of the gear trains of the primary and secondary shafts is made up of three gears enabling the gearbox to drive the secondary shaft at three different speeds. It is possible also to provide a reverse drive (not shown). If reverse is provided, an intermediate gear that is mounted on a shaft secured to the casing is interposed between a gear of the primary shaft and the gear of the secondary shaft, said gear that meshes permanently respectively with the gear of the primary shaft and with the gear of the secondary shaft enabling the secondary shaft to rotate when the corresponding gear is selected in the same direction as the primary shaft.

As mentioned above, it is generally necessary to interpose washers between the gears of the gear train of the secondary shaft, in order to avoid two gears being simultaneously engaged.

In the example shown, the secondary shaft carries two keys disposed in diametrically opposite manner. The keys behave identically, so that the behavior of one key only is described below.

Said key 14 is in the form of a ratchet tooth that is mounted to move axially along the longitudinal guide path 16 of the sleeve 15 via a ring 18 that is mounted to slide on said sleeve 15 and that is mounted to be constrained to move with the key 14.

The guide path 16 is formed by a longitudinal path that is disposed in the outside surface of the sleeve. The ring 18 is caused to slide by means of a control device comprising a fork 19 that is mounted to move angularly via a lever 190 that is mounted to pivot outside the casing and that is carried by the casing. The fork 19 fits into an outer peripheral circular groove in the ring 18 and, while it is being moved angularly, causes the ring to slide along the secondary shaft. The key 14, constituting a selection and control member for selecting and controlling engagement of the gear ratios, comes, while it is moving axially, into engagement with a notch 61 provided in the inner peripheral edge of a gear 6 carried by the secondary shaft and is held inside said notch by means of a return member 21.

Figure 2:
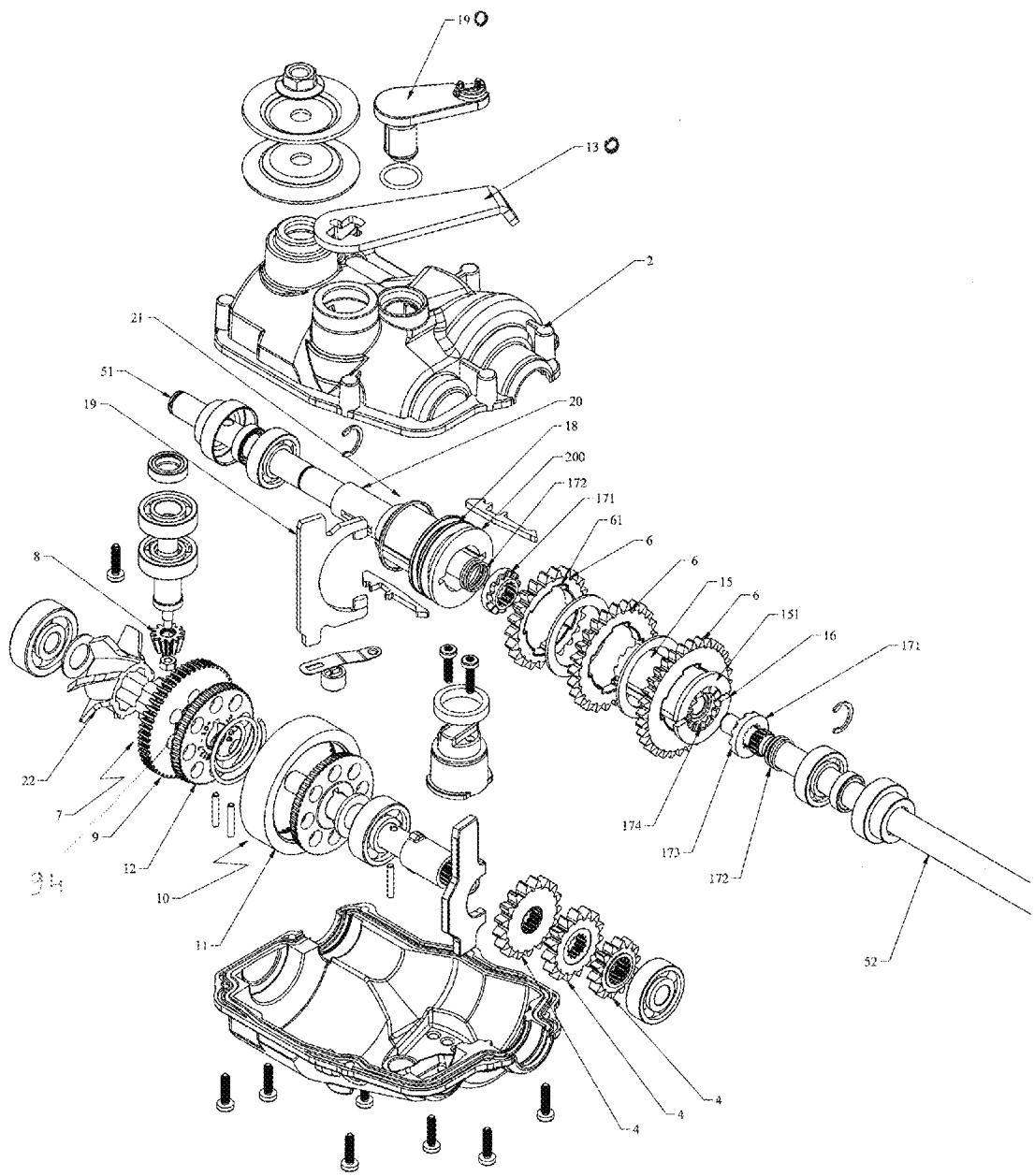
FIG. 2 is an exploded view of the component elements of a gearbox.
Figure 3:
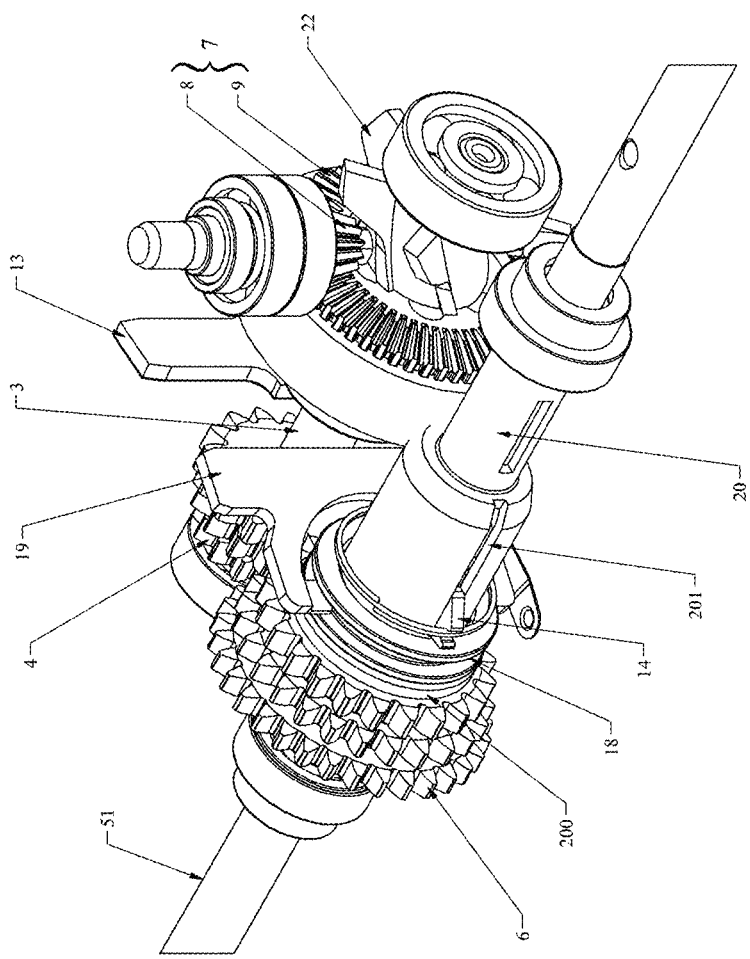
FIG. 3 is a fragmentary perspective view of the inside of the gearbox.
Figure 4:
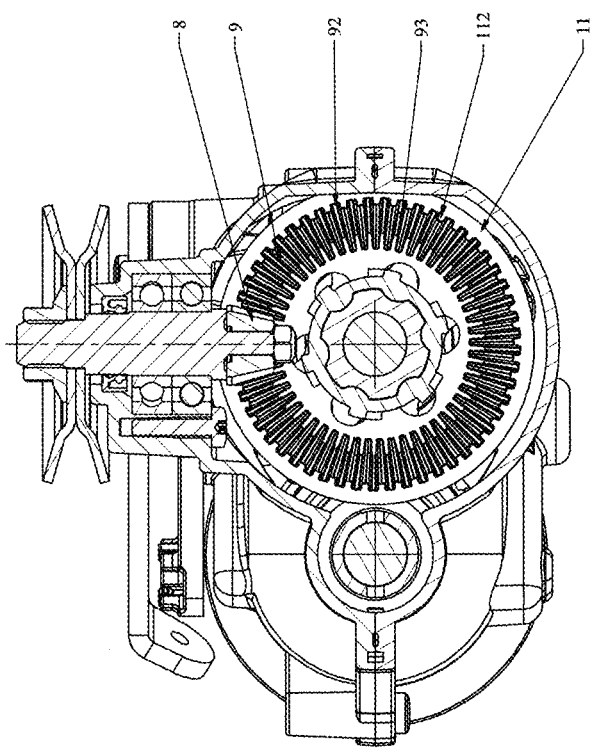
FIG. 4 is a fragmentary section view of the gearbox, taken on the same side as the gearing mechanism.

In FIG. 2, said return member 21 is constituted by a spring washer and is disposed around the key and around the sleeve. Said spring washer urges the ratchet tooth of the key to return into the notch in the gear.

It can be noted that, in the examples shown, the sleeve 15 is a sleeve provided with a shoulder and it is interposed between the half-shafts 51, 52 and a tubular spacer 20 provided with a shoulder, the shoulders 200 and 151 of the spacer 20 and of the sleeve 15 define a space between them, inside which space the gears 6 carried by the secondary shaft 51, 52 are disposed.

The key 14 is guided by the sleeve 15 and the spacer 20 and projects at least partially from the spacer 20 through a longitudinal opening 201 in said spacer 20 so as to come into engagement with the ring 18.

This assembly configuration enables the key to be guided in excellent manner and enables the assembly to be more compact.

Such a gearbox operates as follows.

Firstly, the control device for controlling the gear selector mechanism is actuated to enable the key to move axially until the key comes into engagement with the selected gear corresponding to the desired gear ratio.

Once the gear has been selected, the clutch mechanism can be actuated to enable said mechanism to go from the declutched position to the clutched position.

The rotary movement of the engine of the machine can then be transmitted via the primary shaft and via the gears carried by said primary shaft to the two half-shafts forming the secondary shaft.

When the machine is going round a bend, or when the machine is at standstill and when said machine is being pushed manually, it can happen that one of the two half-shafts is driven at a speed of rotation that is greater than the rotary drive speed at which the sleeve is rotated.

In this situation, the coupling between the dog clutch carried by the half-shaft and the sleeves declutches and the half-shaft can rotate at a speed of rotation greater than the speed of rotation of the sleeve.

When the machine is at a standstill, the two half-shafts being driven in rotation at a speed greater than the speed of rotation of the sleeve can take place at each of the two half-shafts. When the machine is advancing and when only one of the half-shafts is driven in rotation at a speed greater than the speed of rotation of the sleeve, as can apply when the machine is going round a bend, the other half-shaft is driven in rotation at a speed identical to the speed of rotation of the sleeve.

A declutched first coupling is thus provided between one of the half-shafts and the sleeve, and a non-declutched second coupling 7 is provided between the second half-shaft and the sleeve.

The invention claimed is:

1. A gearbox for a self-propelled machine, the gearbox comprising:
   a casing inside which the following are housed, at least in part: a primary shaft equipped with a train of gears that are mounted to be constrained to rotate with said primary shaft; a secondary shaft equipped with a train of gears disposed in alignment with one another and mounted to be free to rotate about said secondary shaft; each gear of the gear train of the primary shaft being held permanently meshing with a respective gear of the secondary shaft; rotary drive means for driving the primary shaft in rotation; and at least one key via which the rotary movement of the primary shaft is suitable for being transmitted to the secondary shaft, said at least one key being mounted to move axially along the secondary shaft and being suitable, during said key's axial movement, for coming into selective contact with the inner peripheral edge of a gear carried by the secondary shaft in such a manner as to engage said gear selectively; wherein the secondary shaft is made up of two half-shafts that are mounted to be free to move in rotation relative to each other, and wherein the gearbox further comprises a sleeve threaded over the two half-shafts, said sleeve being provided with at least one longitudinal guide path, along which the key, which is constrained to rotate with the sleeve, is mounted to move axially, this key-holder sleeve being coupled to each of the half-shafts via a respective declutchable coupling suitable for being declutched when the corresponding half-shaft is driven in rotation in a predetermined direction at a speed of rotation greater than the speed of rotation of the sleeve.

2. A gearbox according to claim 1, wherein at least one of the declutchable couplings between half-shaft and sleeve is a dog clutch having a ratchet function.

3. A gearbox according to claim 2, wherein at least one of the declutchable couplings between half-shaft and sleeve comprises a dog clutch mounted to be constrained to rotate with and to move axially on the half-shaft, this dog clutch being equipped with return means for urging said dog clutch to return to a position close to one end of the sleeve, said dog clutch and the end of the sleeve being equipped with teeth that interpenetrate with one another in the position in which the dog clutch is closer to the end of the sleeve, said teeth being of ramp-shaped profile configured to enable, during the clutching stage, for the end of the sleeve and the dog clutch to be constrained to rotate with each other, and therefore for the rotary movement of the sleeve to be transmitted to the half-shafts and, during the declutching stage, by the dog clutch moving axially in opposition to the return means, for the end of the sleeve and the dog clutch to be released so that they are no longer constrained to rotate with each other.

4. A gearbox according to claim 1, wherein the key (14), or at least one of the keys, is in the form of a ratchet tooth that is mounted to move axially along the longitudinal guide path of the sleeve via a ring that is mounted to slide on said sleeve and that is mounted to be constrained to move with the key.

5. A gearbox according to claim 1, wherein the two half-shafts are held in alignment by means of said sleeve, inside which one end of each half-shaft is received.

6. A gearbox according to claim 1, wherein the sleeve is a sleeve provided with a shoulder and around which the gears carried by the secondary shaft are arranged.

7. A gearbox according to claim 1, wherein the key, constituting a selection and control member for selecting and controlling engagement of the gear ratios, and suitable for coming into engagement with a notch provided in the inner peripheral edge of a gear carried by the secondary shaft, is held inside said notch by means of a return member.

8. A gearbox according to claim 1, wherein the means for driving the primary shaft in rotation include a gearing mechanism having at least one driving member meshing with a driven member that is suitable for being coupled to/decoupled from said primary shaft by means of a clutch mechanism, said clutch mechanism being a cone clutch mechanism comprising at least one female cone and two male cones, the female cone being in the form of a wheel having an axial bore that has conical bearing surfaces, said wheel receiving the male cones that are disposed in alignment with the axial bore of the wheel, and that are suitable, under the action of a control device, for coming into bearing contact with a conical bearing surface of the wheel.

9. A gearbox according to claim 8, wherein the female cone is provided internally with a set of teeth that is offset axially from the conical bearing surfaces relative to the axis of rotation of the component wheel of the cone, so that the conical bearing surfaces are disposed on the same side of the set of teeth, said female cone being mounted, via the set of teeth, to mesh permanently with the driven member of the gearing mechanisms.

10. A gearbox according to claim 9, wherein the driven member of the gearing mechanism is in the form of a tubular body threaded over the primary shaft and mounted to be free to rotate on said shaft, said tubular body being provided at one end with an outer peripheral shoulder carrying, around its periphery, a first set of teeth suitable for coming to mesh with the female cone of the clutch mechanism and, on said outer peripheral shoulder face facing said body, a second set of teeth suitable for coming to mesh with the driving member of the gearing mechanism, said tubular body carrying a bladed wheel mounted to be constrained to rotate with said body, the blades of the wheel being oriented in such a manner as to generate a flow towards the peripheral shoulder provided with through orifices.

11. A gearbox according to claim 1, wherein each of the declutchable couplings between half-shaft and sleeve is a dog clutch having a ratchet function.

12. A gearbox according to claim 2, wherein the key, or at least one of the keys, is in the form of a ratchet tooth that is mounted to move axially along the longitudinal guide path of the sleeve via a ring that is mounted to slide on said sleeve and that is mounted to be constrained to move with the key (14).

13. A gearbox according to claim 3, wherein the key, or at least one of the keys, is in the form of a ratchet tooth that is mounted to move axially along the longitudinal guide path of the sleeve via a ring that is mounted to slide on said sleeve and that is mounted to be constrained to move with the key.

14. A gearbox according to claim 2, wherein the two half-shafts are held in alignment by means of said sleeve, inside which one end of each half-shaft is received.

15. A gearbox according to claim 3, wherein the two half-shafts are held in alignment by means of said sleeve, inside which one end of each half-shaft is received.

16. A gearbox according to claim 4, wherein the two half-shafts are held in alignment by means of said sleeve, inside which one end of each half-shaft is received.

17. A gearbox according to claim 2, wherein the sleeve is a sleeve provided with a shoulder and around which the gears carried by the secondary shaft are arranged.

18. A gearbox according to claim 3, wherein the sleeve is a sleeve provided with a shoulder and around which the gears carried by the secondary shaft are arranged.

19. A gearbox according to claim 4, wherein the sleeve is a sleeve provided with a shoulder and around which the gears carried by the secondary shaft are arranged.

20. A gearbox according to claim 5, wherein the sleeve is a sleeve provided with a shoulder and around which the gears carried by the secondary shaft are arranged.

* * * * *